P. F. MOFFETT.
INSTRUMENT FOR TEACHING AND PERFECTING PENMANSHIP.
APPLICATION FILED JUNE 15, 1921.
1,418,196.   Patented May 30, 1922.
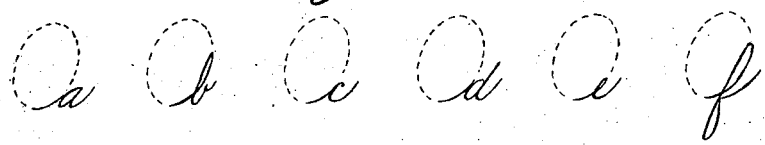
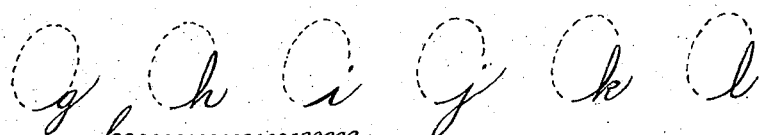
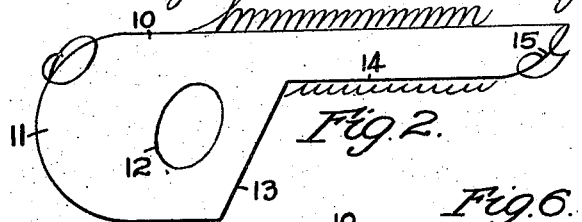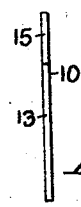
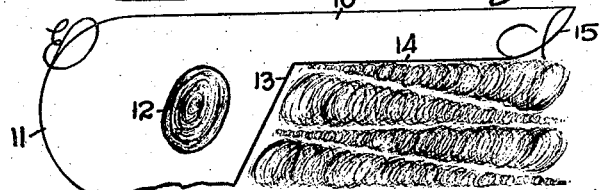
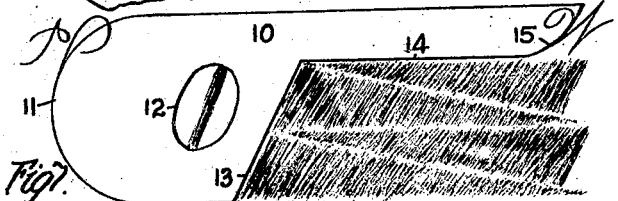
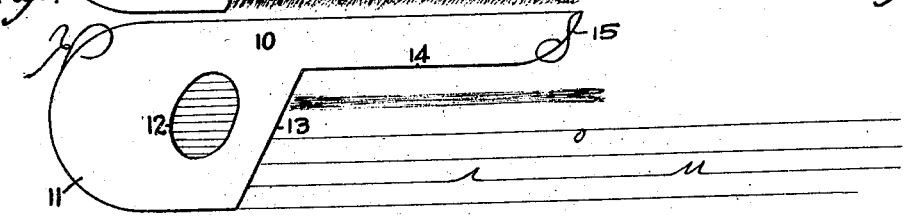

UNITED STATES PATENT OFFICE.

PATRICK F. MOFFETT, OF WORCESTER, MASSACHUSETTS.

INSTRUMENT FOR TEACHING AND PERFECTING PENMANSHIP.

1,418,196.  Specification of Letters Patent.  Patented May 30, 1922.

Application filed June 15, 1921. Serial No. 477,842.

*To all whom it may concern:*

Be it known that I, PATRICK F. MOFFETT, a citizen of the United States, residing at Worcester, in the county of Worcester and State of Massachusetts, have invented a new and useful Instrument for Teaching and Perfecting Penmanship, of which the following is a specification.

This invention relates to a device for use in providing a superior system of teaching handwriting.

The principal objects of the invention are to provide a simple guide which can be used for the purpose of systematically teaching penmanship in all its stages but chiefly in starting children to learn to write in the best manner; also to provide an instrument which will assist either young or old in learning to write or in correcting defective hand writing by the use of two fundamental lines occurring in all writing and constituting the beginning of every letter of the alphabet, namely, the ellipse or oval and the straight line, both slightly inclined from the vertical; and to provide an instrument which will assist the pupil in practicing the formation of ovals and parallel lines which will insure the correct formation of these two fundamental lines and therefore establish a uniform and correct system of writing. The invention also involves the provision of means by which the tops and bottoms of the letters can be kept in alignment and after sufficient practice the pupil will automatically follow out the same method without the use of the instrument.

Further objects and advantages of the invention will appear hereinafter.

Reference is to be had to the accompanying drawings in which—

Fig. 1 is a representation of a number of ovals or ellipses showing how they are employed in the construction of several of the letters of the alphabet that are typical of the whole twenty-six letters.

Fig. 2 is a plan of the instrument which constitutes the subject of this invention in the preferred form, showing some ways in which it can be used;

Fig. 3 is an edge view thereof;

Figs. 4 and 5 are representations of practice lines made by a pupil in using the instrument, and Figs. 6, 7 and 8 are views similar to Fig. 2 showing several kinds of practice lines made with the use of this instrument.

The writing in ordinary Spencerian characters is based mainly on two lines or figures, the ellipse and the straight line. It is possible to start every letter of the alphabet by the use of the lower part of an ellipse with its long axis slightly inclined from the vertical and if that is done the rest of the letter usually follows gracefully from it and is necessarily started at the proper inclination. It is also difficult for many people to make their straight lines parallel as they should be. I have made use of these two facts in designing the instrument which is the subject of this invention.

For that purpose I provide a device 10 in preferably the form of a sheet of metal, celluloid, wood or other thin material, having a main part or handle 11 by which it can be held down on the paper. This is provided with an opening 12 of substantially oval form and inclined forwardly at a slight angle to the vertical or it can be made vertical or slanting in whatever way is necessary to agree with the type of writing to be taught. Adjacent to this opening 12 is a wall 13 which constitutes one important boundary of the instrument 10. This consists of a straight line exactly parallel with the major axis of the oval 12.

I have shown the handle portion 11 of the instrument as formed with a semi-circular outline, its lower and upper edges being parallel with each other and denoting the horizontal direction. These are intended to be placed horizontally on the paper. At the other end of the instrument is a curve 15 constituting part of the outline of the instrument and preferably of elliptical formation of substantially the same shape and inclination as the bottom portion of the ellipse or oval 12.

In the use of the device it is placed on the paper or slate and held down with the left hand. The beginner places a pencil or pen inside the opening 12 at the lower point and, according to the best method which I now know and am using, draws the pencil around the opening inside to the right so as to mark the paper, slate, or the like and form a plurality of perfect closed figures. Then he gradually moves the pencil in from the edge of the guide opening 12 and forms a series of ellipses inside the opening so close together preferably as to eventually come together at the center and fill up all the space within the ellipse. This is shown in Fig. 6. If the pupil is a beginner he will be expected to do this over and over, the idea being to accustom him to the formation of elliptical figures at the desired angle to the horizontal. It is to be noted that the pupil can lean on the left hand and at the same time hold the instrument down with it, while keeping the right arm entirely free.

The next step which I prefer to employ is to place a dot at the center, and form several ovals, gradually increasing in size until the pencil comes in contact with the elliptical outline 12 all around. The figure will appear also much like that shown in Fig. 6. In this way the interior is again completely blackened by a single continuous line forming what are practically ellipses all the way from the center to the outline of the opening. This also is repeated until the pupil becomes familiar with it and is able to form oval scrolls at the proper angle with the help of the instrument.

A third step which is usually introduced in teaching by this instrument is to form scrolls by keeping the pencil in contact with the edges of the opening 12 and moving the instrument gradually along the paper horizontally to blacken the surface inside. In this case all the scrolls are formed of substantially the same size. Then he forms the same scroll under the outer edge 14 of the instrument, without the direct guidance of the opening. The result of this is shown in Fig. 4.

Another exercise is to form straight lines along the line 13 as a guide, moving the instrument, if necessary, along the paper horizontally. The user makes a short line up and down the instrument a quarter of an inch, or shorter with a push and pull stroke and, as control becomes manifest, increases the length of the line until he makes a slant line one inch in length up and down across the instrument under the edge 14. Count on the down stroke from 150 to 200 a minute. The pupil will be able shortly to start at the instrument and form these lines, all except the first, without its direct help to produce the result shown in Fig. 5.

These exercises are for the purpose of accustoming the pupil to the formation of scrolls and straight lines at the proper angle. It will be seen that this is not merely a guide. It assists the hand in certain parts of the operation but in some of the exercises above indicated its main object is to assist the mind to guide the hand and inspire confidence to perform the necessary exercises and to properly form the fundamental elliptical figure or straight line. It is designed to train the arm muscles so as to give them positive correct habits in the formation of ellipses and straight lines and introduces the pupil to the secret of becoming an excellent penman. It starts him right and keeps him trying the right ways of securing success.

After the pupil has become familiarized with the formation of straight lines and ovals in this way he can also use the instrument to form parts of curves along the line 15 or by inverting the instrument, along the semi-circle at the handle end and in similar ways.

Another use of the instrument is to trace around the opening 12 lightly ten times and fill the space in the center with slant lines. This is indicated in Fig. 7, while a similar exercise with horizontal lines is indicated in Fig. 8.

With the instrument the pupil makes horizontal lines one-quarter of an inch in length at first increasing gradually. To make the exercise interesting the pupil makes a line, then an "O" or a dot, successive O's or dots being spaced a half inch apart and repeats increasing the distance, until he can go across the page with one straight line. This is shown in Fig. 8. Full use of the arm across the page or even half a page, unassisted by the instrument, is evidence that freedom of action has been achieved. The pupil can make the lines in one direction or moving to the right. After this is mastered it will be easy to make lines in both directions.

The instrument can be used for the making of slant lines or ovals continuously, but of gradually increasing or decreasing size. This is done by holding it first horizontally and then at an inclination to serve as a limit guide. Certain results are shown in Figs. 6 and 7. It will be noted also that the edges 13 and 14 can be used as straight edges for various purposes.

Having repeated these exercises over and over until the pupil is accustomed to forming correct ovals and straight lines, the next purpose is to use these for the formation of the letters of the alphabet. The system of doing this is sufficiently illustrated in Fig. 1 in which several of the small letters are shown. To carry out this method up to this point, if it is the alphabet which is to be taught, twenty-six ovals are formed on the paper by the use of this instrument or they can be printed in exactly the position in which they would be formed by it. Then the pupil forms various letters starting always at the bottom of the ellipse as shown in Fig. 1. It will be found that every letter of the alphabet can be started at this point. It is easy to form the rest of the letter with a reasonable degree of accuracy if it is started in exactly the right way.

Another use of the instrument is to employ the line 14 and the top line above it and parallel with it in insuring the evenness of the tops and bottoms of letters. This is used for practice purposes to limit the top or bottom of the letters as it may be desired or of the straight lines as shown in Fig. 2 in practice. When it is desired to limit the tops of the letters to make them uniform the instrument is used in the position shown in Fig. 2 and the so-called low letters written below the surface 14 as shown in that figure. In order to use it for limiting the bottoms of the letters they are written above it as also indicated. This is done for practice and the pupil will soon become proficient in lining up his letters both at the top and at the bottom. The instrument also furnishes a good means for practicing the making of figures and other characters.

I have illustrated the formation of some of the capital letters at the ends of the instrument. I have found in practice that their formation is assisted by this system and their form and inclination assured in substantially the same way as the illustrations indicate. Although I have shown a different capital letter at each curve, it is to be understood that the curves 12 and 15 and also the semi-circle at the handle end can all be used for starting each of these capitals. The bottom of the curve 12 at the right is substantially like the curve 15 and the semi-circle is so near like them that it can be used in the same way. However the slant is slightly different. It is to be observed therefore, that although I have spoken of an ellipse and a semi-circle the invention is not restricted to any mathematically true curve.

It will be seen therefore that by the use of this instrument a correct system of hand writing can be taught and that either a pupil starting in school, or a person whose hand writing is poor, can be taught to form the letters in an accurate graceful manner.

Although I have illustrated and described only a certain specific form of the instrument and a definite method of procedure in using it, I am aware of the fact that modifications can be made in the form of the instrument in accordance with the system of writing to be taught or in the method of teaching, without departing from the scope of this invention as expressed in the claims.

Therefore, I do not wish to be limited in these respects but what I do claim is:—

1. As an article of manufacture, an instrument for the purpose described having a body adapted to be held down on the surface on which the writing is to be made and having a horizontal upper edge and an opening through the body of oval shape with its major axis inclined toward said horizontal edge, and having two lower horizontal edges spaced apart and connected by a straight edge of the instrument located at an inclination to the horizontal of the same degree as the inclination of the major axis of said oval.

2. As an article of manufacture, an instrument for the purpose described comprising a flat thin body having an upper horizontal bounding surface and a lower horizontal bounding surface connected by a semi-circular end constituting a handle for manipulating the instrument and a guide for starting capital letters and having an inclined edge extending upwardly from the lower horizontal surface at an angle and stopping short of said upper horizontal surface and having a horizontal edge extending therefrom parallel to said upper horizontal surface connected to it by a curve at the end, and provided with an oval opening therethrough at a distance inside the inclined straight edge and having its axis parallel therewith.

In testimony whereof I have hereunto affixed my signature.

PATRICK F. MOFFETT.